United States Patent Office 3,015,151
Patented Jan. 2, 1962

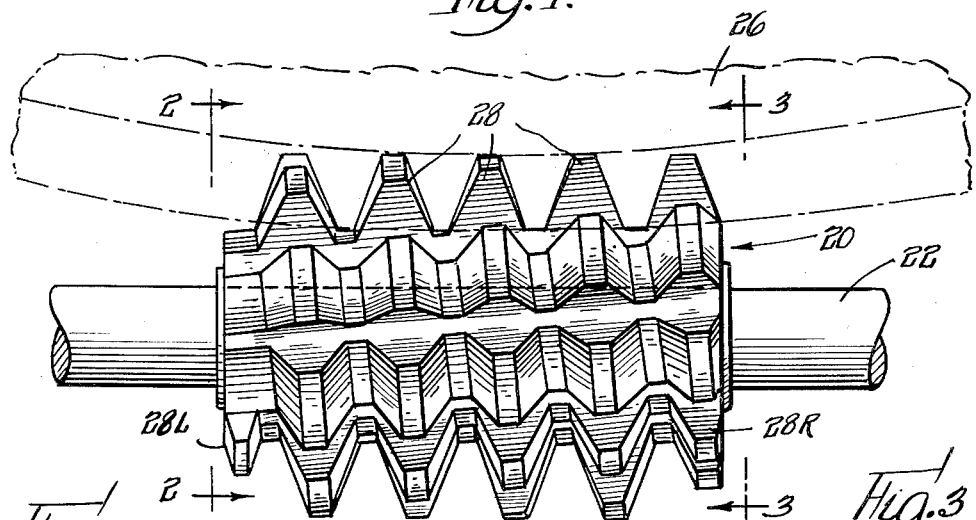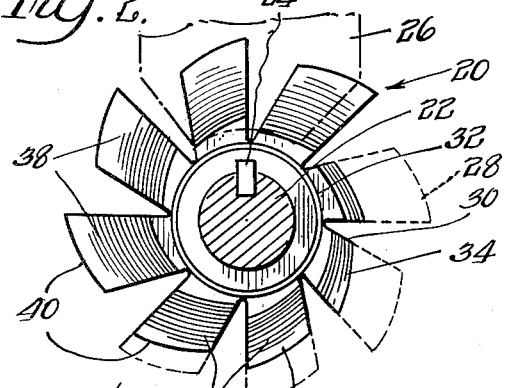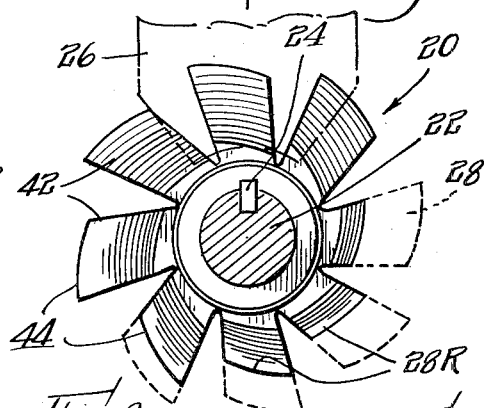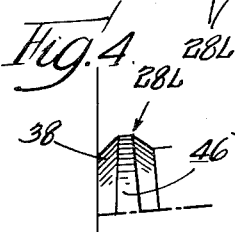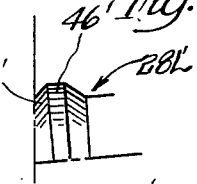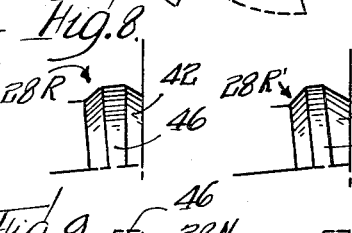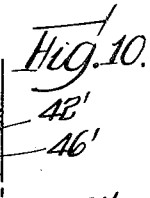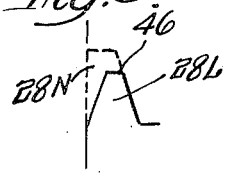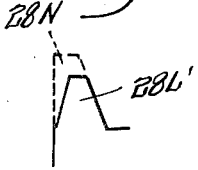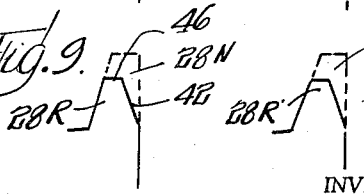

3,015,151
HOB
Wilbur F. Pergande, Chicago, Ill., assignor to Illinois Tool Works, Chicago, Ill., a corporation of Illinois
Filed Jan. 20, 1959, Ser. No. 787,969
4 Claims. (Cl. 29—103)

This invention is concerned generally with the art of gear cutting and the like, and more particularly with an improved hob.

Hobs are generally made without any pressure angle on the outer sides of partial teeth located on the ends of the hob, as in cylindrical hobs. These teeth, therefore, have no cutting clearance. However, when cutting large gears with extremely large numbers of teeth these teeth necessarily come into action, and do not cut properly. In such extremely large gears, it is common practice literally to bury the entire hob within the blank when cutting the teeth thereon.

End teeth are brought into play in other instances, such as when a manufacturer shifts the hob axially in order to cut primarily with the end teeth and the adjacent helices thereto, in order to utilize all of the teeth on a hob prior to resharpening.

When the end teeth are used for cutting, substantial forces are exerted thereon. As will be appreciated, the end teeth are only partial teeth, and do not have the strength of the full sized intermediate teeth. Accordingly, it is not uncommon for one or more of these end teeth to break, and thereby render the hob inoperative. Such breakage frequently causes damage to the gear blank to such an extent that it must be discarded.

Accordingly, it is an object of this invention to provide a cylindrical hob having improved end teeth.

In addition, it is an object of this invention to provide a cylindrical hob wherein all of the teeth on the hob may be used for cutting, as in the formation of gears.

Furthermore, it is an object of this invention to provide a cylindrical hob wherein the partial end teeth are provided with suitable clearance for utilizing the end teeth for cutting.

A more specific object of this invention is to provide the end teeth of a cylindrical hob with both top cam and side pressure angle.

Other and further objects and advantages of the present invention will be apparent from the following description when taken in connection with the accompanying drawings wherein:

FIG. 1 is a side view of a hob constructed in accordance with the principles of this invention, shown in cooperation with a gear blank.

FIG. 2 is an end view of the hob as taken along the line 2—2 in FIG. 1.

FIG. 3 is an end view of the hob from the opposite end, as taken along the line 3—3 in FIG. 1.

FIG. 4 is a fragmentary axial section taken through an end tooth, and showing one form of the invention.

FIG. 5 is a diagrammatic view illustrating the principles of FIG. 4.

FIG. 6 is a view similar to FIG. 4 showing a preferred form of the invention.

FIG. 7 is a diagrammatic view similar to FIG. 5, but corresponding to FIG. 6.

FIG. 8 is an axial sectional view similar to Fig. 4, but taken along the opposite end of the hob.

FIG. 9 is a diagrammatic view illustrating the principles of FIG. 8.

FIG. 10 is an axial sectional view similar to FIG. 6 but at the right end of the hob and FIG. 11 is a diagrammatic view illustrating the principles of FIG. 10.

Referring now in greater particularity to the drawings there will be seen in FIGS. 1–3 a hob indicated generally by the numeral 20, and fixed on a hob shaft 22 in accordance with conventional practices, being keyed thereto as at 24. The hob cooperates with a gear blank indicated at 26, and as will be seen in FIG. 1, the hob is literally buried in the gear blank, so that the end teeth necessarily cut the blank.

The hob is provided with a plurality of teeth 28 in accordance with the usual practice. There are partial teeth at the left end indicated at 28L, and there are corresponding partial teeth at the right end, indicated as 28R.

As will be observed in FIG. 2, the outer end faces of the left end teeth are, in part, flat or planar perpendicular to the axis of the hob, as indicated at 30. However, as the teeth progress out in length the ends of the teeth are relieved or provided with side pressure angle as at 38. The outer ends of the teeth in all instances are relieved as indicated at 40 to provide top clearance. Similarly, the outer faces of the right end teeth 28 are (FIG. 3) provided with side pressure angle as at 42, and with top or end relief as at 44. As will be appreciated, the pressure angles are similar to the corresponding pressure angles of the intermediate teeth.

As is illustrated in FIGS. 4 and 5, the side pressure angle 38 can be cylindrical, that is without lead. As a result, the lands 46 at the top of the left end teeth 28L become narrower toward the back. The correspondence of the teeth which have side pressure angle and end cam with the normal practice is illustrated in FIG. 5 wherein the teeth 28L (or a representative one of such teeth) is shown in solid lines against a dashed line representation of the normal practice as indicated at 28N.

A preferred form of the invention is shown in FIG. 6. In this form of the invention the side pressure angle 38' of the end teeth 28L' is provided with helical lead. As a result, the lands 46' are of uniform width. The correspondence of one of the teeth 28L' is shown in FIG. 7 in solid lines against a dashed line representation of the normal practice as indicated at 28N.

The right end teeth are shown in FIGS. 8 and 10, corresponding to the left end teeth of FIGS. 4 and 6. In particular, the teeth 28 are as shown in FIG. 8 provided with side clearance or pressure angle 42 of a cylindrical variety, i.e. without lead. As a result, the land 46 becomes wider at the back end of the tooth. The correspondence of such a tooth relative to the normal practice is illustrated in FIG. 9 with the tooth indicated at 28R, and the normal practice indicated at 28N.

As indicated in connection with FIG. 6, it is preferred to provide a helical characteristic to the side relief or pressure angle. The right end teeth of such preferred form are shown in FIG. 10, the relief being indicated at 42' on the right end teeth 28R', the land 46' being of uniform width. The right end tooth 28R' is shown in FIG. 11 corresponding to the normal practice at 28N.

It will be obvious that the teeth on the right hand side will have less clearance than the full height teeth, but will still have sufficient clearance for good cutting, will be seen in particular with regard to the figures illustrating the teeth in correspondence with the conventional practice. The teeth on the left hand side will have more cutting clearance on the rear than the full height teeth, and this avoids any danger of breakage.

The hob as herein disclosed is superior to conventional hobs in the provision of end cam and side pressure angle on the end teeth, as well as the clearance relief at the ends of the end teeth. In connection with FIGS. 4 and 8, wherein reference was made to cylindrical relief, it will be apparent that the resulting surface of the pressure angle of the teeth is a frustum of a cone.

The specific examples of the invention as herein shown and described are for illustrative purposes only. Various changes in structure will no doubt occur to those skilled in the art and such changes will be understood as coming within the scope of this invention in so far as they fall within the purview of the following claims.

The invention is claimed as follows:

1. A hob comprising a rotatable hob body having abrupt ends, a series of hobbing teeth integral with the periphery of said body and being disposed in a generally helical pattern of circumferentially spaced teeth which extends along the full length of the hob body, the individual teeth of said series which are spaced inwardly from the ends of said body being of full size and width and being shaped to define top lands of substantial axial width and sloping side surfaces having a helical lead and extending inwardly from said top lands substantially to the bases of the teeth, said full sized teeth being relieved on opposite sides and at the tops thereof, the individual teeth at opposite ends of said series which are located with reference to said body axially beyond said full size teeth being substantial in number and being individually reduced in width relative to the width of said full size teeth by the axial termination of said body, the sides of said reduced width end teeth opposite from the adjacent end of said body having a sloping helical form conforming to that of corresponding side surfaces of said full size teeth and located in said helical pattern, the sides of said reduced width teeth contiguous to the adjacent end of said body being shaped to define side surfaces which slope outwardly and away from the adjacent body end, said last mentioned sloping tooth surfaces extending radially inward substantially to the bases of the teeth and having inner edges substantially flush with the adjacent end of said body, said last mentioned tooth surfaces having helical forms conforming to that of corresponding side surfaces of the full size teeth, said reduced width teeth being truncated at the tops thereof to define top lands of substantial axial width, and each reduced width tooth being relieved at the top and at opposite sides thereof.

2. A hob comprising a rotatable hob body having abrupt ends, a circumferential series of hobbing teeth integral with said body and being disposed in a generally helical pattern which extends along the full length of the hob body, the individual teeth of said series which are spaced inwardly from the ends of said body being of full size and width and being shaped to define end lands of substantial axial width and sloping side surfaces having a helical lead, said full sized teeth being relieved on opposite sides and at the ends thereof, said series of teeth including a substantial number of individual end teeth at each end of the series which are located with reference to said body axially boyond said full size teeth and which are individually reduced in width relative to the width of said full size teeth by the axial termination of said body within the axial span of what would be a full width base of the end teeth, sides of said end teeth opposite from the adjacent end of said body having a sloping helical form conforming to that of corresponding side surfaces of said full size teeth and being located in said helical pattern, the sides of said end teeth contiguous to the adjacent end of said body being shaped to define side surfaces which slope outwardly and away from the adjacent body end, said last mentioned sloping tooth surfaces extending radially inward substantially to the base of the teeth, said end teeth being truncated at the tops thereof to define top lands of substantial axial width, and each end tooth being relieved at the top and at opposite sides thereof.

3. A hob comprising a rotatable hob body having abrupt ends, a circumferential series of hobbing teeth integral with said body and being disposed in a generally helical pattern which extends the full length of the hob body, the individual teeth of said series which are spaced inwardly from the ends of said body being of full size and width and being shaped to define end lands of substantial axial width and sloping side surfaces having a helical lead, said full size teeth being relieved on opposite sides and at the ends thereof, said series of teeth including a substantial number of individual teeth at each end of the series which are located with reference to said body axially beyond said full size teeth and which are individually reduced in width relative to the width of said full size teeth by the axial termination of said body within the axial span of what would be a full width base of the reduced width teeth, the sides of said reduced width teeth opposite from the adjacent end of said body having a sloping form conforming to that of corresponding side surfaces of said full size teeth, the sides of said reduced width teeth contiguous to the adjacent end of said body being shaped to define sloping side surfaces conforming in shape to corresponding side surfaces of the full size teeth and extending radially inward to the base of the teeth, and said reduced width teeth being truncated and relieved at the tops thereof to define top lands of substantial axial width.

4. A hob comprising a rotatable hob body having abrupt ends, a circumferential series of hobbing teeth integral with said body and being disposed in a generally helical pattern which extends the full length of the hob body, the individual teeth of said series which are spaced inwardly from the ends of said body being of full size and width and being shaped to define end lands of substantial axial width and sloping side surfaces having a helical lead, said full size teeth being relieved on opposite sides and at the ends thereof, said series of teeth including a substantial number of individual teeth at one end of the series which are located with reference to said body axially beyond said full size teeth and which are individually reduced in width relative to the width of said full size teeth by the axial termination of said body within the axial span of what would be a full width base of the individual ones of the reduced width teeth, the sides of said reduced width teeth opposite from the adjacent end of said body having a sloping form conforming to that of corresponding sides of said full size teeth, the sides of said reduced width teeth contiguous to the adjacent end of said body being shaped to define sloping side surfaces conforming in shape to corresponding side surfaces of the full size teeth and extending radially inward substantially to the base of the teeth, and said reduced width teeth being truncated and relieved at the tops thereof to define top lands of substantial axial width.

References Cited in the file of this patent

UNITED STATES PATENTS

| 1,430,485 | Zimmerman | Sept. 26, 1922 |
| 1,436,159 | Fitzpatrick | Nov. 21, 1922 |
| 1,707,105 | Wheatley | Mar. 26, 1929 |
| 2,026,215 | Cone | Dec. 31, 1935 |
| 2,542,546 | Mackmann | Feb. 20, 1951 |

FOREIGN PATENTS

| 452,239 | Great Britain | Aug. 19, 1936 |
| 487,986 | Italy | Dec. 11, 1953 |
| 672,117 | Great Britain | May 14, 1952 |
| 778,064 | France | Dec. 15, 1934 |
| 846,650 | Germany | Sept. 15, 1952 |